R. E. REED.
CAMERA.
APPLICATION FILED MAR. 20, 1916.
1,260,049.
Patented Mar. 19, 1918.
2 SHEETS—SHEET 1.
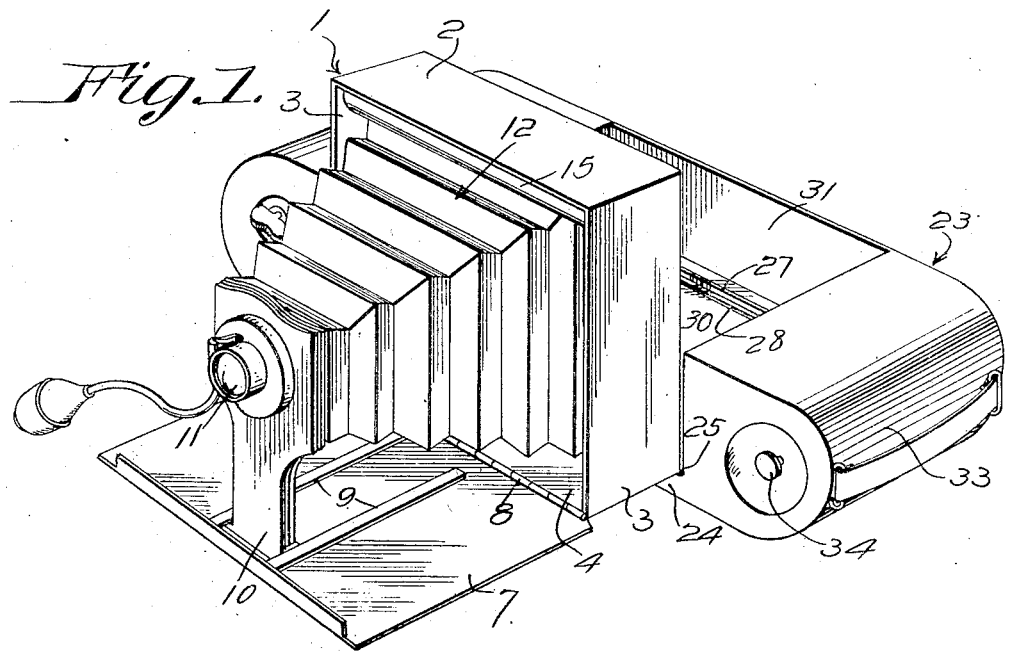
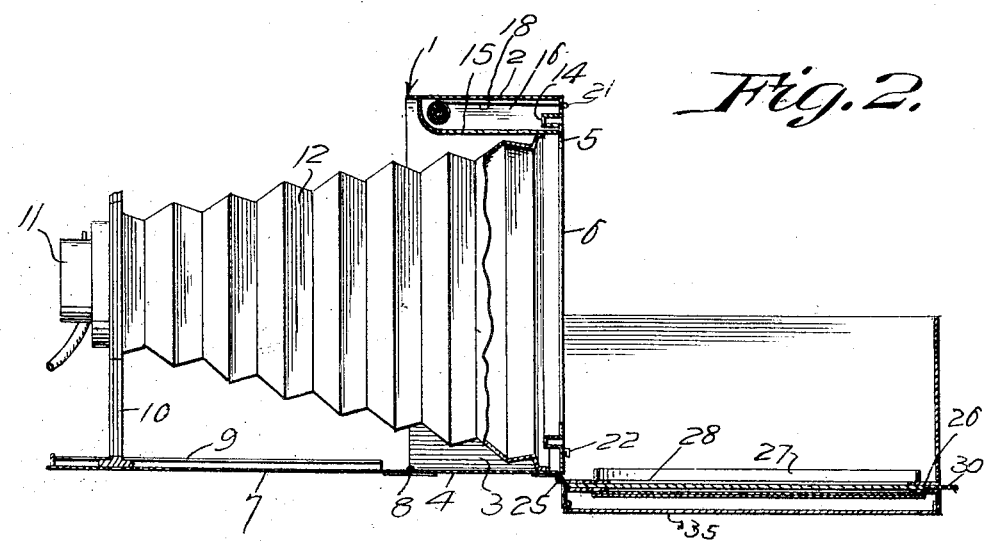
Rodney E. Reed,
Inventor
Witnesses
by C. A. Snow & Co.
Attorneys

R. E. REED.
CAMERA.
APPLICATION FILED MAR. 20, 1916.

1,260,049.

Patented Mar. 19, 1918.
2 SHEETS—SHEET 2.

Witnesses

Rodney E. Reed,
Inventor by C. A. Snow & Co.
Attorneys

UNITED STATES PATENT OFFICE.

RODNEY E. REED, OF BELLEVUE, IDAHO.

CAMERA.

1,260,049.  Specification of Letters Patent.  Patented Mar. 19, 1918.

Application filed March 20, 1916. Serial No. 85,449.

*To all whom it may concern:*

Be it known that I, RODNEY E. REED, a citizen of the United States, residing at Bellevue, in the county of Blaine and State of Idaho, have invented a new and useful Camera, of which the following is a specification.

The device forming the subject matter of this application is a camera, and the invention aims to provide novel means whereby a focusing may be brought about without exposing the roll of film which the camera carries.

Another object of the invention is to provide a novel form of focusing screen.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in perspective, a camera constructed in accordance with the present invention;

Fig. 2 is a vertical section of the structure shown in Fig. 1;

Figure 3:
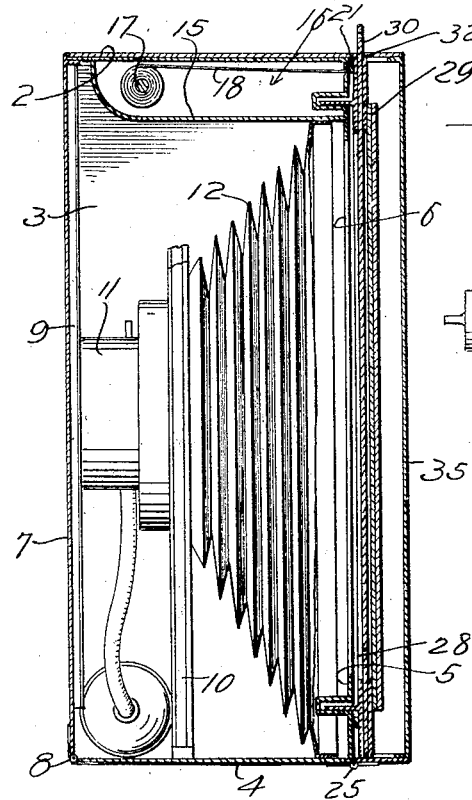
Fig. 3 is a vertical section wherein the device is shown in folded compact form.

The device forming the subject matter of this application may be mounted on cameras of widely different sorts but in order to present a concrete embodiment, there is shown in the drawings, a camera comprising a case 1 including a top 2, sides 3, a bottom 4 and a back 5 having an opening 6. The numeral 7 indicates a front united by a hinge 8 with the bottom 4. The front 7 carries tracks 9 adapted to coöperate with the face plate 10 carrying a lens 11 and the usual appurtenances thereto. The forward end of a bellows 12 is assembled with the face plate 10. The back 5 is provided with a forwardly projecting trough 14 defining a groove which circumscribes the opening 6 in the back. Disposed parallel to the top 2 of the case 1 is a partition 15, the forward end of which is connected with the top, the rear end of which is connected with the back 5 above the opening 6 therein, to define a compartment 16. The rear end of the bellows 12 is connected to the partition 15, to the sides 3 of the case and to the bottom 4 thereof.

Figure 5:
Fig. 5 is a sectional detail illustrating the spring actuated roller whereby the focusing curtain is controlled.
Figure 4:
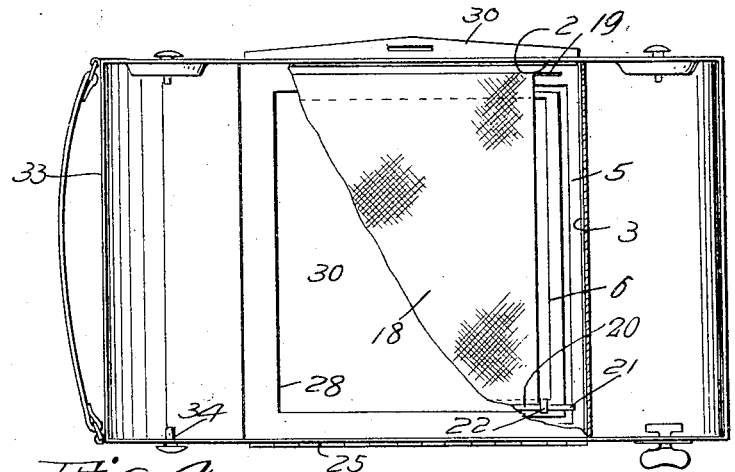
Fig. 4 is a vertical, transverse section, it being presupposed that the observer is looking toward the front of the camera.

Journaled for rotation on the sides 3 of the case 1 and located in the compartment 16 near to the forward end thereof is a spring actuated roller 17 shown in detail in Fig. 5, it being understood that the roller 17 may be variously constructed without jeopardizing the utility of the invention. A flexible focusing curtain 18 is secured at its forward end to the roller 17, the curtain being made of any translucent material, as thin white silk. In the back 5 there is formed a slit 19, through which the curtain 18 passes, the rear end of the curtain being supplied with a rod 20 which is of sufficient diameter so that it can not be drawn through the slit 19 under the action of the spring roller 17.

The ends 21 of the rod 20 project beyond the edges of the focusing curtain 18, and are adapted to be engaged by hooks 22, mounted on the back 5. The construction is such that the curtain 18 can be drawn downwardly across the opening 6 in the back 5 and be held in place by engaging the ends 21 of the rod 20 on the curtain with the hooks 22 on the back 5. In this manner, the curtain may be so disposed as to receive the image projected thereon for focusing purposes. When the occasion for the use of the focusing curtain 18 has passed, the ends 21 of the rod 20 are detached from the hooks 22, whereupon the spring actuated roller 17 will reel in the curtain until the rod comes into contact with the back 5.

The numeral 23 designates generally a film holder including a bottom 24 united by hinges 25 with the bottom 4 of the case 1. Upstanding from the bottom 24 of the film holder 23 are tubular casings 33 which are open at the back, the casings 33 being provided with the usual means 34 for holding and manipulating two film-spools. The space between the casings 33 is bridged across at the back of the structure by a detachable closure 35 of the usual type. Extended between the casings 33 and located near to the back of the film holder 23 is a partition 26 having an opening 28 through which the film may be exposed. Projecting forwardly from the partition 26 and surrounding the opening 28 is a flange 27 which, when the film holder 23 is swung upwardly, is received in the trough or groove 14 of the case, to prevent the leakage of light into the interior of the camera.

The partition 26 in the film holder 23 is supplied with guides 29 adapted to receive a vertically movable slide 30. The spool-receiving casings 33 are connected by a top 31 having a slit 32 through which the slide 30 may be inserted into the guides 29.

In practical operation, the slide 30 is mounted in place, in order to close the opening 28 in the film holder 23, thereby protecting the film, it being understood that the film moves to the rear of the slide. The film holder 23 is then turned down into the position shown in Fig. 1, or is lowered still farther, until it hangs in a vertical position. The focusing curtain 18 is pulled downwardly and the ends 21 of the rod 20 are connected with the hooks 22. The focusing operation may then be carried out. After the focusing has been completed, the lower end of the curtain is released from the hooks 22, and the spring actuated roller 17 draws up the curtain. The film holder 23 is then swung up into the position shown in Fig. 3, whereupon the slide 30 is removed, so that the film may be exposed in the usual manner.

From the foregoing it will be seen that the invention provides a novel means whereby a camera adapted to receive a roll of film may be focused, novel means being provided for actuating and controlling the focusing curtain, novel means being provided whereby the curtain is housed, and novel means being provided whereby a leakage of light between the body or case 1 of the camera and the holder 23 will be prevented, when the parts above mentioned are in the positions of Fig. 3.

Having thus described the invention, what is claimed is:—

In a camera, a case including a back having an opening and provided with a slit; a spring actuated roller journaled in the case; a flexible focusing screen connected with the roller and having a free end extended through the slit; a rod mounted on the free end of the screen and movable therewith, the rod being of greater diameter that the width of the slit to serve as a back-engaging stop when the screen is reeled onto the roller, the ends of the rod projecting beyond the opening to bear upon the back, thereby to prevent the free end of the screen from entering the opening when the screen is advanced and retracted; hooks carried by the back and receiving the projecting ends of the rod to hold the screen across the opening against the action of the spring-actuated roller, the hooks coacting with the edges of the screen to prevent a lateral shifting of the screen; and means for holding a sensitized element in operative relation to the opening.

In testimony that I claim the foregoing as my own, I have hereto affixed my signature in the presence of two witnesses.

RODNEY E. REED.

Witnesses:
M. EDYTHE JONES,
O. D. C. WILSON.

Copies of this patent may be obtained for five cents each, by addressing the "Commissioner of Patents, Washington, D. C."